(12) United States Patent
Wang

(10) Patent No.: US 6,830,074 B2
(45) Date of Patent: *Dec. 14, 2004

(54) VENT FOR A CONSTANT VELOCITY JOINT

(75) Inventor: Shen-Ling Allen Wang, Northville, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/716,225

(22) Filed: Nov. 18, 2003

(65) Prior Publication Data

US 2004/0099322 A1 May 27, 2004

Related U.S. Application Data

(63) Continuation of application No. 10/167,357, filed on Jun. 10, 2002, now Pat. No. 6,699,129.

(51) Int. Cl.[7] .............................................. F16K 15/16
(52) U.S. Cl. .................. 137/855; 137/854; 137/512.15; 464/17
(58) Field of Search .......................... 137/47, 854, 855, 137/512.15; 277/634, 636, 928

(56) References Cited

U.S. PATENT DOCUMENTS

| 2,624,587 | A | * | 1/1953 | Watson et al. ............ 137/454.4 |
| 3,354,903 | A | * | 11/1967 | Caruso ................... 137/512.15 |
| 4,319,467 | A | * | 3/1982 | Hegler et al. ................ 464/173 |
| 4,392,838 | A | * | 7/1983 | Welschof et al. ........... 464/175 |
| 4,759,385 | A | * | 7/1988 | Hudson, Jr. ............. 137/512.15 |
| 6,354,602 | B1 | * | 3/2002 | Oldenburg ................... 277/630 |
| 6,516,829 | B1 | * | 2/2003 | Townsend et al. .......... 137/517 |
| 6,699,129 | B2 | * | 3/2004 | Wang .......................... 464/17 |

* cited by examiner

Primary Examiner—Ramesh Krishnamurthy
(74) Attorney, Agent, or Firm—Jennifer M. Brumbaugh; Mick A. Nylander

(57) ABSTRACT

A constant velocity joint vent for use in a constant velocity joint of automotive vehicles. The constant velocity joint vent includes a flapper valve generally having a circular shape. The constant velocity joint vent also includes a first and second assembly post extending from an inside surface of the flapper valve. A circumferential compression limiter is also located on an inside surface of the flapper valve. The flapper valve also includes a sealing bead located at the outer periphery thereof. The flapper valve is connected via the first and second assembly post to a cover that includes an orifice for venting of high pressure gas to the outer atmosphere while also repelling contaminants from entering the constant velocity joint.

13 Claims, 9 Drawing Sheets

VENT FOR A CONSTANT VELOCITY JOINT

This application is a continuation of application Ser. No. 10/167,357 filed Jun. 10, 2002 now U.S. Pat. No 6,699,129.

TECHNICAL FIELD

The present invention generally relates to constant velocity joints, and more particularly, relates to a venting mechanism for use in a constant velocity joint.

BACKGROUND ART

Constant velocity joints (CV joints) are common components in automotive vehicles. Typically constant velocity joints are used where transmission of a constant velocity rotary motion is desired or required. The common types of constant velocity joints are plunging tripod, fixed tripod, a plunging ball joint and a fixed ball joint. Constant velocity joints currently are used in front-wheel drive vehicles or rear-wheel drive vehicles and on propeller shafts found on rear-wheel drive, all-wheel drive and four-wheel drive vehicles. The plunging CV joints allow for axial movement during operation without the use of slip splines. Constant velocity joints are generally grease lubricated for life and sealed by a boot. Constant velocity joints are sealed in order to retain grease inside the joints while keeping contaminants and foreign matter, such as dirt and water, out of the joint. To achieve this protection, the constant velocity joint is usually enclosed at the open end of the outer race by a sealing boot made of a rubber, thermoplastic, silicone or other pliable material. The opposite end of the outer race is generally enclosed by a dome or cap, known as a grease cap in the case of a disk type joint. A mono block or integral stem and race design style does not use a grease cap. Instead it is sealed by the internal geometry of the outer race. The sealing and protection of the constant velocity joint is necessary because contamination of the inner chamber may cause internal damage to the joint. Furthermore, once the inner chamber of the constant velocity joint is lubricated, it is lubricated for life.

During operation, the constant velocity joint creates internal pressure in the inner chamber of the joint. These internal pressures increase as rotational speed of the constant velocity joint increases. These pressures have to be vented to the outer atmosphere in order to prevent pressure build up which occurs during operation of the joint. If the pressure build up is allowed to reach critical state, the boot may crack or have a blow out, thus losing sealability. Generally, a constant velocity joint is vented by placing a small hole generally in the center of the grease cap or at least one hole around the outer periphery of the outer race. These prior methods of venting the gas have some drawbacks because, if the constant velocity joint is in a static state and not rotating, the lubricating grease may migrate towards the venting hole and block or hinder its function of venting any internal gas pressure. This type of vent may also allow the infiltration of contaminants into the inner chamber of the constant velocity joint. Furthermore, the constant velocity joint has a tendency, after running for long periods of time, to create very high temperatures along with high pressures which are vented through the prior art vent holes. However, if the constant velocity joint is submerged or saturated in water or other contaminants, the water or other contaminants may, via a pressure differential, be propelled into the constant velocity joint, thus contaminating the grease and reducing the life of the constant velocity joint. Ingestion of water and other contaminants through the vent hole may reduce the life expectancy of the constant velocity joint.

Therefore, there is a need in the art for a constant velocity joint that will prevent the build up of internal gas pressure while eliminating the ingress of contaminants into the constant velocity joint. Furthermore, there is a need in the art for a vent that is low in cost, easy to manufacture and install on the constant velocity joint.

DISCLOSURE OF THE INVENTION

One object of the present invention is to provide an improved constant velocity joint.

Another object of the present invention is to provide a novel venting solution for a constant velocity joint.

Yet a further object of the present invention is to provide a vent for a constant velocity joint that is capable of releasing gas under pressure to the atmosphere.

Still a further object of the present invention is to provide a vent that will prevent the entrance of contaminants and liquids into the constant velocity joint.

Yet a further object of the present invention is to provide a constant velocity joint that will use a spring force in its venting mechanism to help seal the constant velocity joint under non-venting conditions.

To achieve the foregoing objects, a vent for a constant velocity joint for use in a vehicle, is disclosed. The constant velocity joint vent includes a cover. The vent also includes a flapper valve secured to the cover. At least one post extends from the flapper valve and is secured to the cover. The vent also includes a bead extending from one side of the flapper valve that engages with the cover when the valve is in a closed position. The vent also includes a locator projection extending from the flapper valve near a mid point thereof.

One advantage of the present invention is that the constant velocity joint includes a vent that will allow for equalization of pressure inside the constant velocity joint to the outer atmosphere.

A further advantage of the present invention is that the constant velocity joint vent will stop the entry of contaminants into the constant velocity joint.

Still a further advantage of the present invention is that the constant velocity joint vent will be specifically designed to have a predetermined spring force that will allow a flapper valve of the vent to return to a sealing position.

Yet another advantage of the present invention is that the constant velocity joint vent will be easier to manufacture and reduce the cost of the constant velocity joint.

Other objects, features and advantages of the present invention will become apparent from the subsequent description and the appended claims, taken in conjunction with the accompanying drawings.

DESCRIPTION OF THE EMBODIMENT(S)

Figure 1:
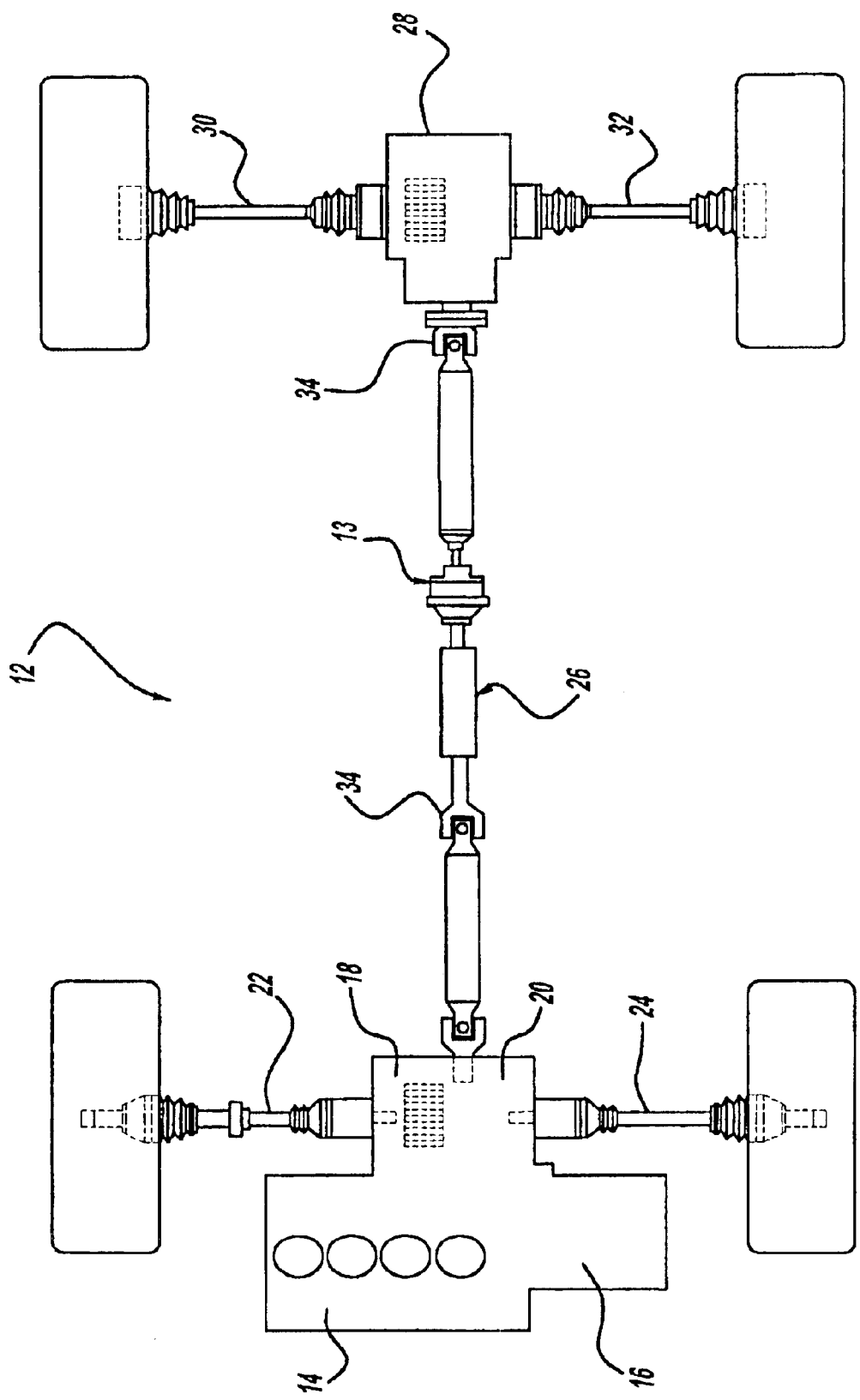
FIG. 1 shows a plan view for a vehicle driveline.

Referring to the drawings, a constant velocity joint 13 according to the present invention is shown. It should be noted that any type of constant velocity joint, such as a plunging tripod, fixed tripod, etc. may be used according to the present invention. The present invention includes a novel and improved method of venting the constant velocity joint 13.

FIG. 1 shows a typical driveline 12 of an automotive vehicle. The driveline 12 shown in FIG. 1 is a typical all-wheel drive vehicle, however, it should be noted that a constant velocity joint 13 having the current invention can also be used in a rear-wheel drive vehicle, front-wheel drive vehicle, all-wheel drive or four-wheel drive vehicle. The driveline 12 includes an engine 14 that is connected to a transmission 16 and a power take off unit 18. A front differential 20 is rotatably connected to the power takeoff unit 18. The front differential 20 has a right hand front half shaft 22 and a left hand front half shaft 24, each of which are connected to a wheel and deliver power to the wheels. On both ends of the right hand front half shaft 22 and the left hand front half shaft 24 are constant velocity joints 13. A propeller shaft 26 connects the front differential 20 to the rear differential 28, wherein the rear differential 28 includes a rear right hand half shaft 30 and a rear left hand half shaft 32, each of which ends with a wheel on one end thereof. A CV joint 13 is located on both ends of the half shaft S that connect to the wheel and rear differential 28. The propeller shaft 26, as shown in FIG. 1, is a three piece propeller shaft that includes a plurality of Carden joints 34 and one high speed constant velocity joint 13. The constant velocity joints 13 transmit power to the wheels through the drive shaft 26, even if the wheels or the shaft 26 have changing angles due to steering, raising or lowering of the suspension of the vehicle. The constant velocity joints 13 may be of any of the standard types known, such as plunging tripod, a cross groove joint, a fixed joint, a fixed tripod joint, or double offset joint, all of which are commonly known in terms of the art for different varieties of constant velocity joints. Constant velocity joints allow for transmission of constant velocities at angles which are found in everyday driving conditions of automotive vehicles on both half shafts and prop shafts of these vehicles.

Figure 2:
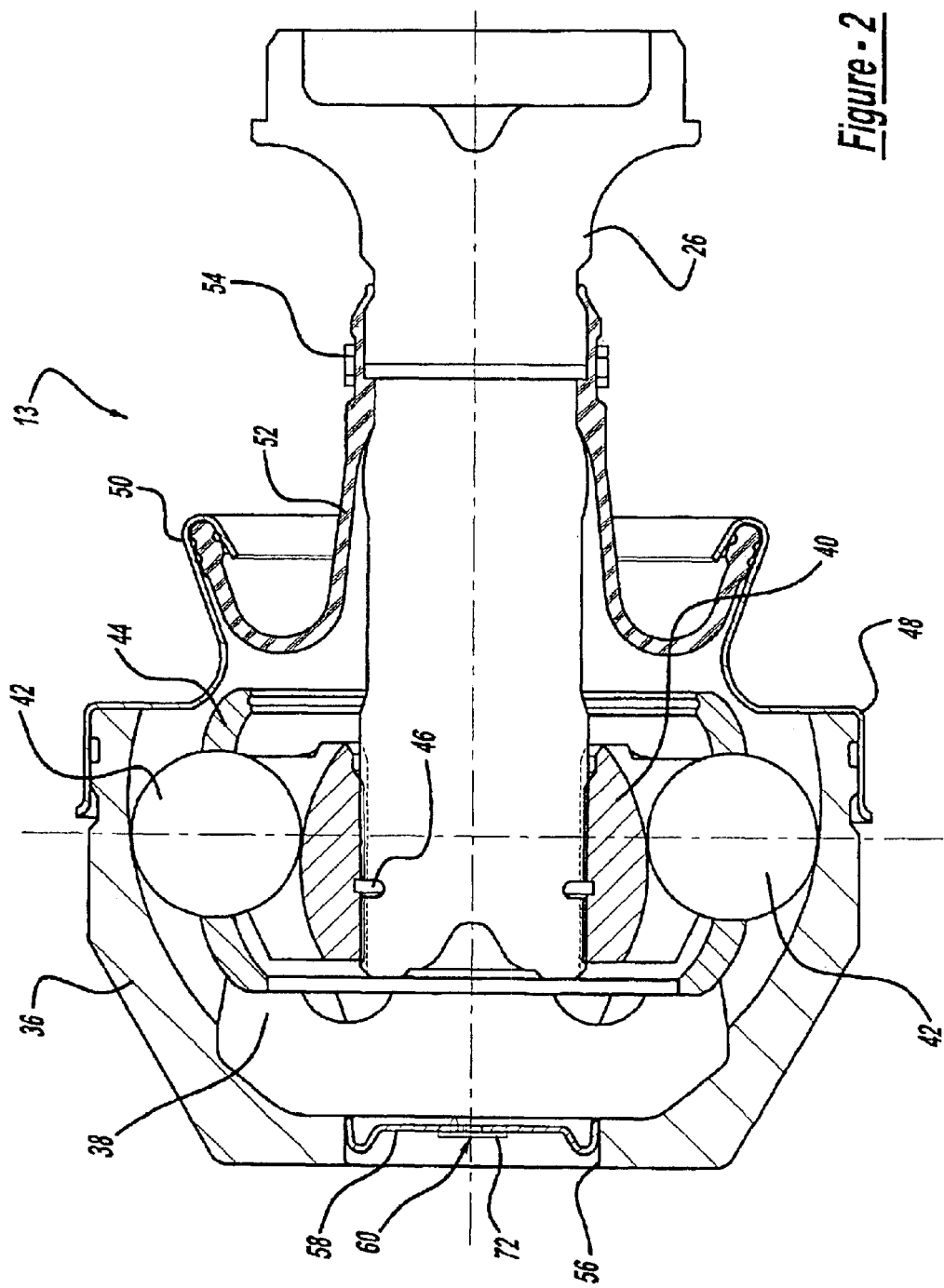
FIG. 2 shows a cross section of a constant velocity joint according to the present invention.
Figure 3:
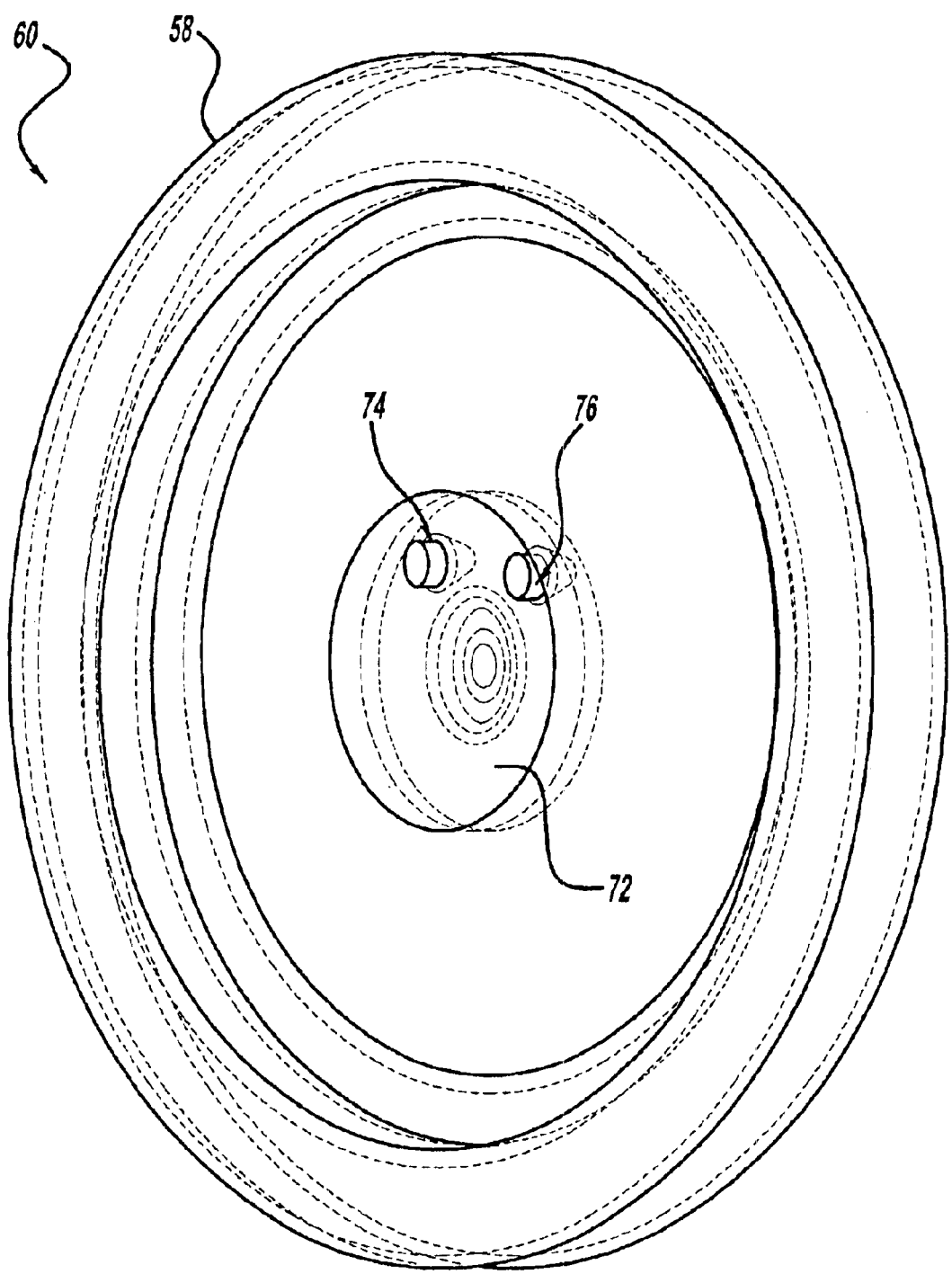
FIG. 3 shows a perspective view of the constant velocity joint vent according to the present invention.
Figure 4:
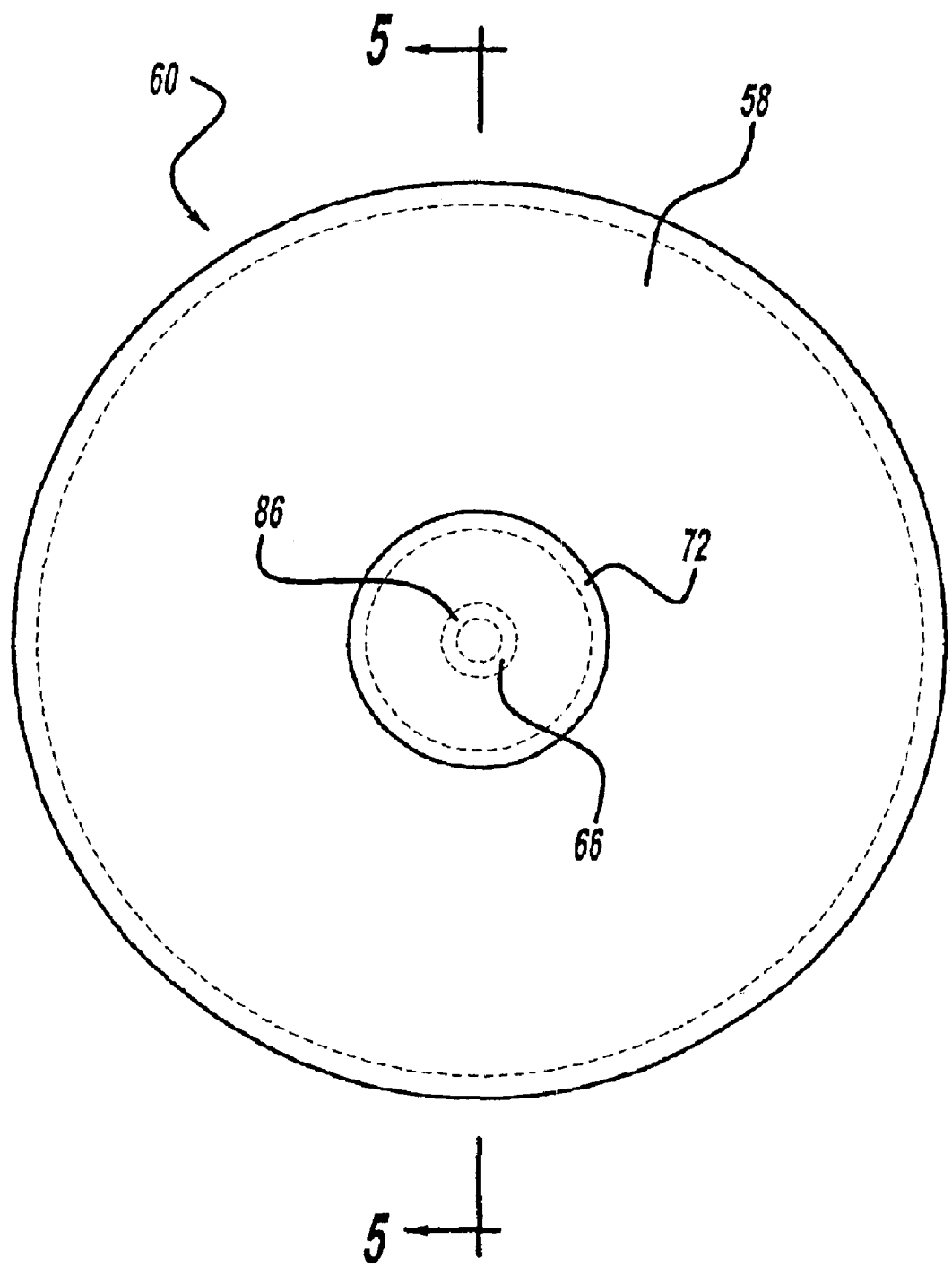
FIG. 4 shows a top view of the constant velocity joint vent according to the present invention.
Figure 5:
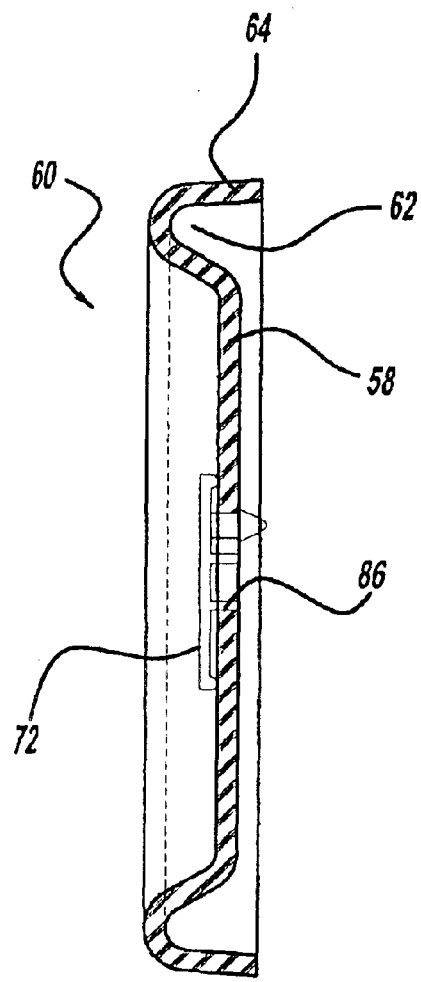
FIG. 5 shows a cross section of the constant velocity joint vent taken along line 4—4 of FIG. 4.
Figure 6:
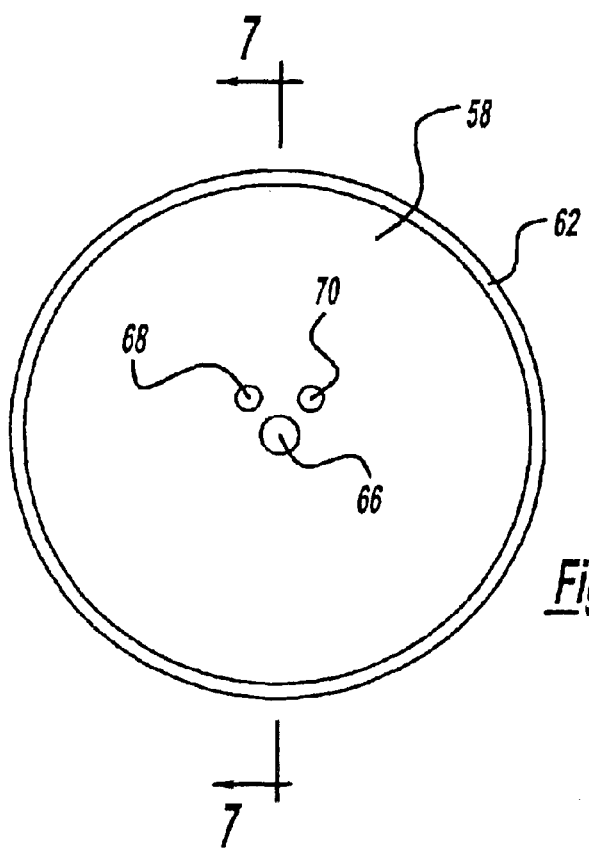
FIG. 6 shows a top view of the vent cover or plug according to the present invention.
Figure 7:
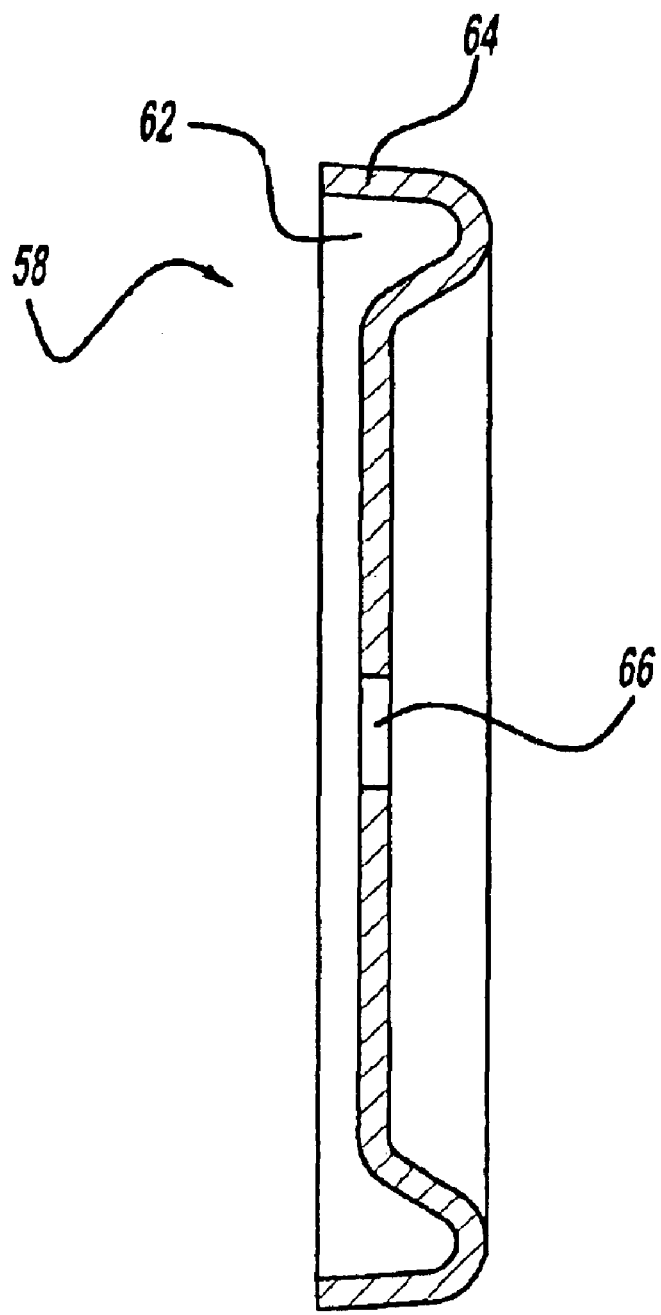
FIG. 7 shows a cross section of the constant velocity joint vent cover taken along line 6—6 of FIG. 6.
Figure 8:
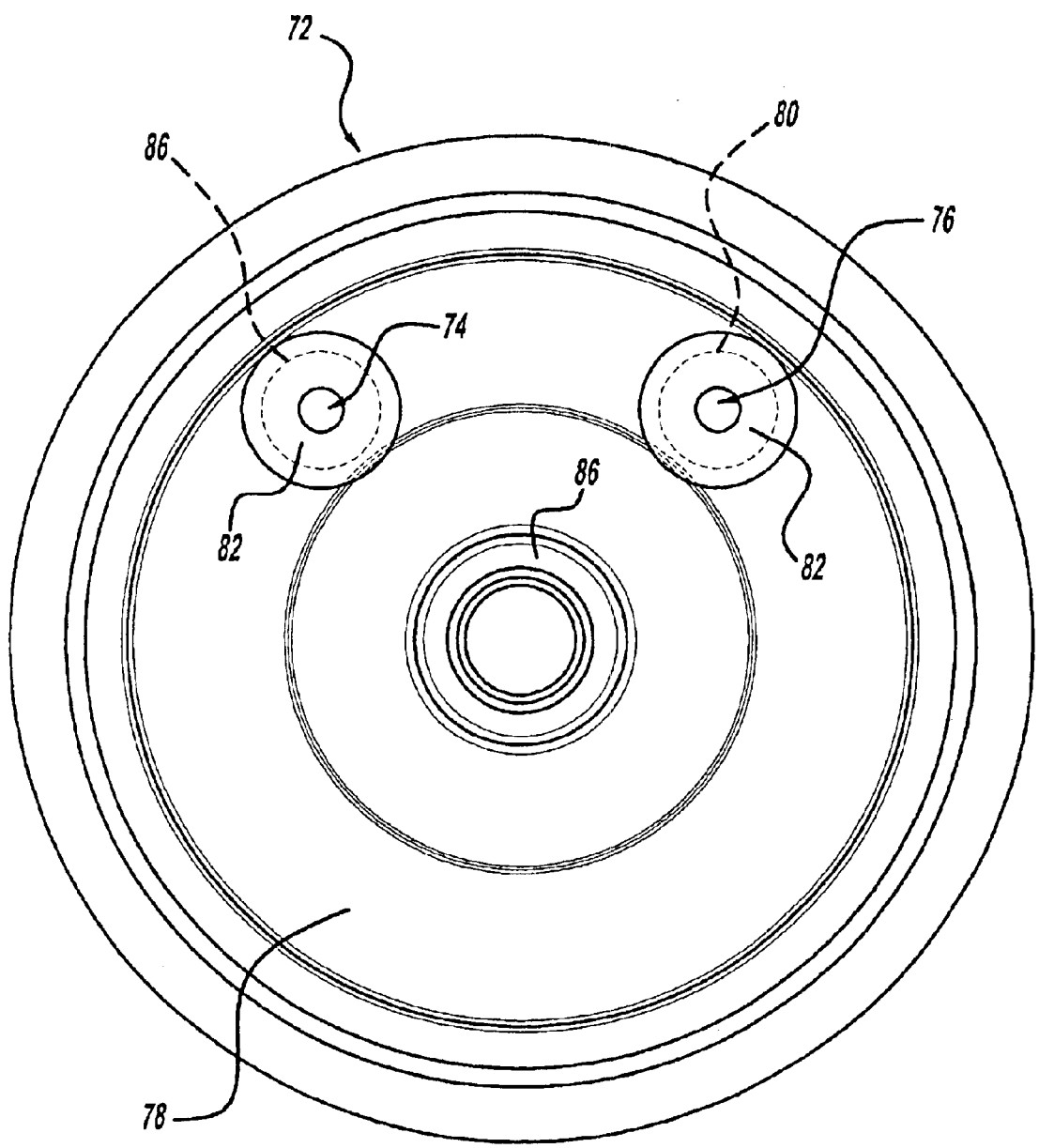
FIG. 8 shows a bottom view of the constant velocity joint vent flapper valve according to the present invention.
Figure 9:
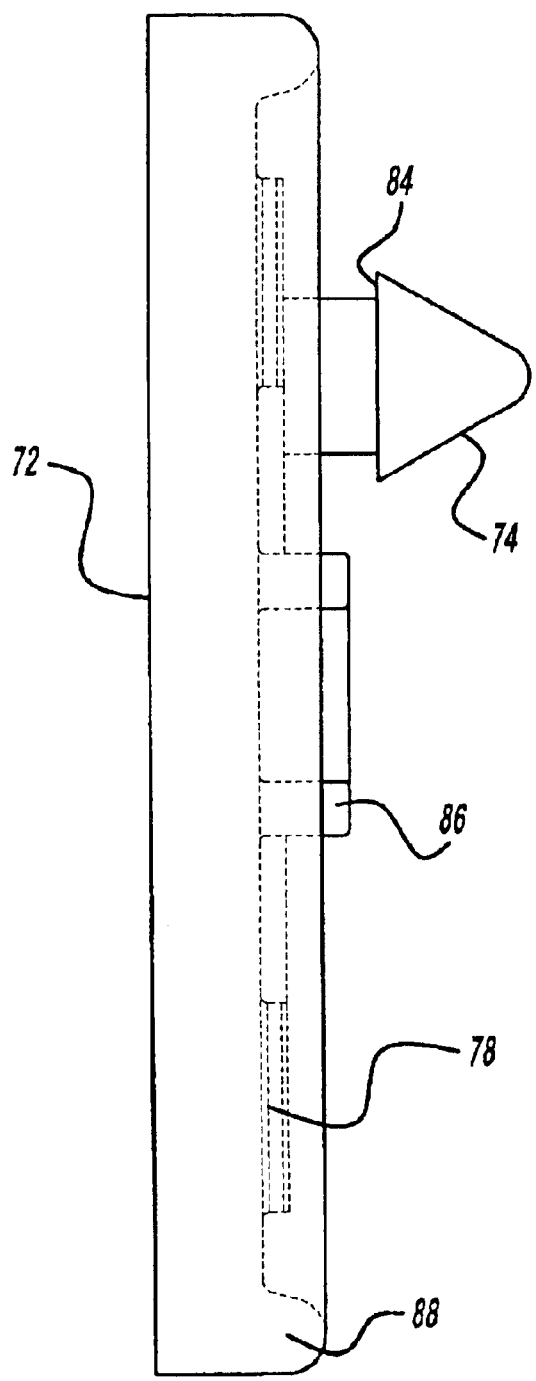
FIG. 9 shows a side view of the constant velocity joint vent flapper valve according to the present invention.
Figure 10:
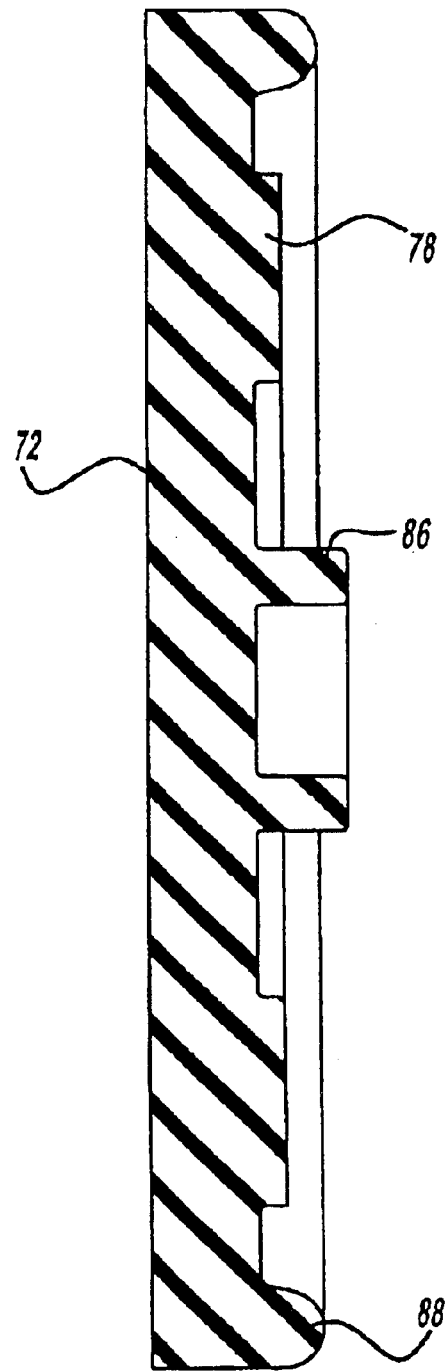
FIG. 10 shows a cross section of the constant velocity joint vent flapper valve according to the present invention.
Figure 11:
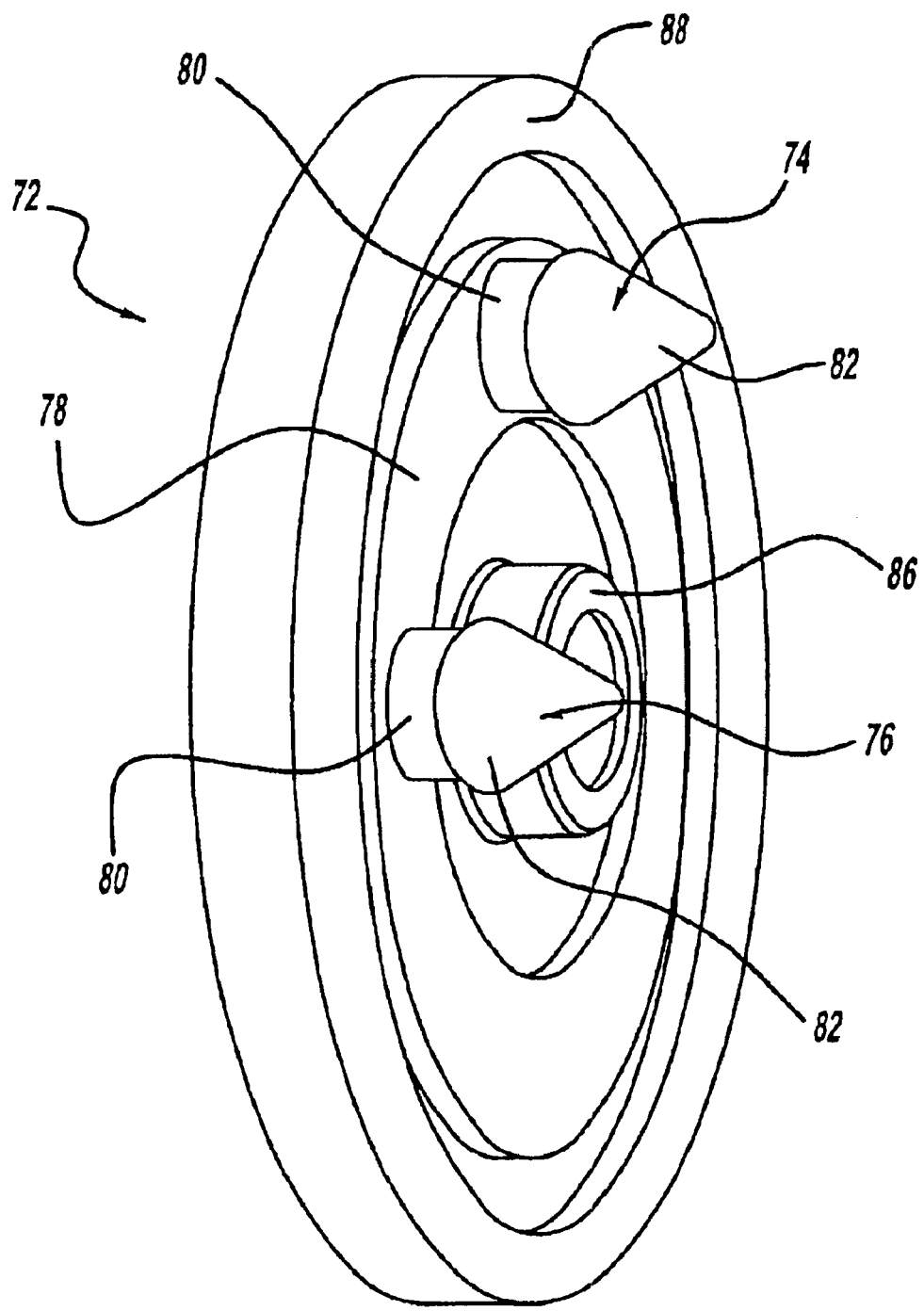
FIG. 11 shows a perspective view of the constant velocity joint vent flapper valve according to the present invention.

FIG. 2 shows one embodiment of the present invention. The constant velocity joint 13 is a fixed constant velocity joint of the mono-block style and is generally used in the prop shaft 26 in an all-wheel drive vehicle. It should be noted that any other type or variety of constant velocity joint may also be used for the present invention. The constant velocity joint 13 as shown in FIG. 2 includes an outer race 36 which has a shaft 26 extending from one end thereof. An inner wall of the outer race 36 generally defines the constant velocity joint inner chamber 38. An inner race 40 is arranged or located within the outer race 36. The inner race 40 is connected to the drive shaft or prop shaft 26 of the vehicle. A plurality of balls or rolling elements 42 are located between an outer surface of the inner race 40 and an inner surface of the outer race 36. The ball 42 is held in position between the outer race 36 and the inner race 40 surfaces by a cage 44. Each race ball 42 is located within an indentation of the outer race 36 inner surface. The rotation of the outer race 36 will rotate the inner race 40 at the same or constant speed thus allowing for constant velocity to flow through the joint between the prop shaft 26 and the rear differential 28, that is angled up to a predetermined fixed angle. The constant velocity joint 13 will allow the angle to change because the balls 42 will be able to rotate and compensate for any difference in the angle between the shafts by moving within the outer race 36 and the inner race 40 indentations.

A ring retainer 46 is located on the inside surface of the inner race 40 to allow for a connection between the prop shaft 26 and the inner race 40. A boot cover 48 is secured to the outer surface of the outer race 36. One end of the boot cover 48 has a channel 50 that extends along the entire periphery of the boot cover 48. One end of a boot 52, which in one embodiment, is made of a urethane or other rubber material, contacts the boot cover 48. However, it should be noted that any other type of hard plastic or soft rubber like material or any other known pliable material may also be used for the boot 52. The boot 52 is secured within the channel 50 of the boot cover 48 while the opposite end of the boot 52 engages the drive shaft 26 and is held in place by a boot clamp 54. The boot 52 will seal the constant velocity joint 13 from any outside contaminants such as water, dirt and road grime. The simpleness of the urethane boot 52 allows for a seal interface through any angle of inclination that a drive shaft or half shaft may encounter during normal driving operations.

An interior surface of the outer race 36 includes a first shoulder portion 56 and a second shoulder portion. The first shoulder portion 56 includes a plug or cover 58 which is generally made of a metal material and seals the outer race inner chamber 38 from transmission oils or contaminants of the transmission. In contact with the second shoulder of the outer race 36 is a second plug or cover which in one embodiment is made of a metal material but may be made of any other type of ceramic, hard plastic or other metal composite material depending on the needs and design requirements of the constant velocity joint 13.

The vent 60 for the present constant velocity joint 13 is shown in FIGS. 2–11. The vent 60 includes the cover 58 as identified above. The cover 58 generally has a circular disk like shape. The cover 58 in one embodiment, is made of a metal material however it should be noted that any other type of hard plastic, composite or other metallic material may also be used for the present invention. It should further be noted that any other shape may be used but in one embodiment a circular shape is used. The shape and design of the cover 58 may be changed depending on the design characteristics of the constant velocity joint 13. The cover 58 generally includes a groove or notch 62 around the outer periphery thereof. The groove 62 allows the cover 58 to have a compression spring like effect when installed into the shoulder portion 56 of the outer race 36 of the constant velocity joint 13. The outer extension 64 of the notch 62 will contact the outer race 36 and create a seal like connection between the outer race 36 and the cover 58. The cover 58 also includes a circular orifice 66 located at a mid point thereof. This circular orifice 66 will be used as a path to allow the venting of hot gasses from the internal chamber 38 of the constant velocity joint 13 to the outer atmosphere. Located near to and in a symmetrical pattern is a second 68 and third circular orifice 70 through the cover 58. The second and third circular orifices 68, 70 are located on the same radius and generally are, smaller diameter orifices than the first orifice 66 of the cover 58. The second and third orifices 68, 70 are used to connect a flapper valve 72 to the cover 58. It should be noted that the cover 58 is capable of separating the internal chamber 38 of the constant velocity joint 13 from the outer atmosphere or it will separate the internal chamber 38 from a second chamber which will include an orifice through an outside wall of a shaft extending from the constant velocity joint outer race to the atmosphere. Either way the cover 58 will allow for venting to the outer atmosphere of any pressurized gas from the constant velocity joint 13.

The vent 60 also includes a flapper valve 72 generally having a circular disk like shape. It should be noted that any other shape may be used, but in this embodiment a circular disk like shape is used to ensure that the constant velocity joint vent 60 will be in balance during rotational operation of the constant velocity joint 13. In one embodiment the flapper valve 72 is made of a pliable material that will permeate air. The pliable material can be anything such as rubber, silicone or neoprene, etc., depending on the design requirements for the constant velocity joint 13. The material must have a spring factor such that if it is bent it will return to a previously held position. The flapper valve 72 will be in contact with and engage with in a sealing manner the cover 58 on one side thereof. The flapper valve 72 will be secured to the cover 58 such that a portion of the flapper valve 72 is capable of lifting off of the cover 58 thus opening the first orifice 66 of the cover 58 and allowing for the passage of pressurized gas from the internal chamber 38 of the constant velocity joint 13 to the atmosphere.

The flapper valve 72 has at least one assembly post 74 extending from one side thereof, however in one embodiment a second post 76 is also used. The assembly posts 74, 76 are located on a common radius of the flapper valve 72. The assembly posts 74, 76 generally extend from the flapper valve 72 at a compression limiter 78. The assembly posts 74, 76 generally have a first cylindrical portion 80 extending from the flapper valve 72 and then on the end thereof a cone like member 82. The bottom radius of the cone 82 is larger than the radius of the cylindrical portion 80. Therefore, this will create a shoulder portion 84 where the cone member 82 intersects with the cylindrical portion 80 on the assembly posts 74, 76. The assembly posts 74, 76 are separated by a distance equal to that of the separation of the second and third orifice 68, 70 of the cover 58. The flapper valve 72 will be secured to the cover 58 via the assembly posts 74, 76 being inserted into the second and third orifices 68, 70 and held in place by the shoulder portion 80 of the assembly posts 74, 76 engaging and holding against the cover 58. It should also be noted that in a another contemplated embodiment the assembly posts 74, 76 will include a circular groove directly adjacent to the cone end of the assembly posts 74, 76 such that the groove is arranged around the inner edges of the orifices 68, 70 of the cover 58 and is held in place within the groove. The assembly posts 74, 76 in one embodiment are molded directly into the flapper valve 72 and are also made out of the same pliable material. The assembly posts 74, 76 will have a spring effect/action that will allow the flapper valve 72 to bend at a moment created by the assembly posts 74, 76 and then once the pressure is released the assembly posts 74, 76 will, via its spring action, return the flapper valve 72 to engagement and an appropriate seal with the cover 58.

The flapper valve 72 also includes on an inside surface thereof a compression limiter 78 which generally has a ring like shape. The compression limiter 78 extends a predetermined distance from the flapper valve 72 inner surface. The compression limiter 78 has a predetermined radial width depending on the design characteristics for the vent system. The compression limiter 78 will be used to control the compression of the flapper valve 72 against the cover 58 when the vent 60 is in its closed or sealed position. The compression limiter 78 will insure there is rigidity across the flapper valve 72, and that the flapper valve 72 does not collapse upon itself thus allowing for leakage during a sealing condition. As noted above in one embodiment the first and second assembly posts 74, 76 will extend from the compression limiter on the inside surface of the flapper valve 72, but it should be noted that the posts 74, 76 can be located elsewhere on the flapper valve 72.

The flapper valve 72 also includes a locator projection 86 extending from an inside surface thereof a predetermined distance. The locator projection 86 generally has a circular ring like shape. The locator projection 86 is located at the center point of the flapper valve 72. The locator projection 86 has the same or nearly the same diameter as that of the first orifice 66 of the cover 58. Hence when the vent 60 is in a sealed or closed position, the locator projection 86 will be arranged within the first circular orifice 66 of the cover 58. Thus, providing a seal between the internal chamber 38 of the constant velocity joint 13 and the outer atmosphere. The fit of the locator projection 86 within the first orifice 66 is such that there will not be a leak around the locator projection 86 until a predetermined threshold of pressure is reached. When the predetermined threshold of pressure is reached the locator projection 86 will begin to lift out of the first orifice 66 of the cover 58. Once the locator projection 86 clears the plane of the first orifice 66 of the cover 58 a path will be created for the venting of any internal pressurized gas to the outer atmosphere. Upon equalization of the pressure between the internal chamber 38 and the outer atmosphere the flapper valve 72 will, via the spring effect of the first and second assembly posts 74, 76 and any back pressure, compress against the cover 58 thus allowing the locator projection 86 to once again enter the first orifice 66 of the cover 58 and create the necessary sealing effect. The locator projection 86 extends a predetermined distance from the inside surface of the flapper valve 72 such that in the closed position the locator projection 86 will extend within and beyond the inner surface of the cover 58. It should be noted that the locator projection 86 is also used to locate the valve properly upon the cover 58 to insure for proper sealing of the vent mechanism. Furthermore, the locator projection 86 will help to prevent the flapper valve 72 from detaching from the cover 58 due to any twisting or radial forces that might be applied to the vent flapper valve 72.

The flapper valve 72 also includes a sealing bead 88 extending from an inside surface of the flapper valve 72. The sealing bead 88 generally is located on the outer circumferential periphery of the flapper valve 72. However, it should be noted that the sealing bead 88 may be located at any radius of the flapper valve 72 and also that the compression limiter 78 could be located at a radius other than the one shown in the drawings. The sealing bead 88 is generally molded directly into the flapper valve 72. The sealing bead 88 generally has a half circle cross section. The sealing bead 88 will be used to insure a proper seal between the flapper valve 72 and the outside surface of the cover 58. The sealing bead 88 will also be the primary seal to any contaminants or water from entering the internal chamber 38 of the constant velocity joint 13. Thus, when in the closed position the sealing bead 88 will compress against the outer surface of the cover 58 creating an impervious seal to water and other contaminants such as dust from entering the constant velocity joint 13, due to back pressure effecting the outer surface of the flapper valve 72 and the spring coefficient of the assembly posts 74, 76. It should be noted that in other embodiments the sealing bead 88, assembly posts 74, 76, locator projection and compression limiter 78 may be attached other than by molding directly into the flapper valve 72 and can be attached by any sort of adhesive or any other known attachment means for pliable materials.

In operation the constant velocity joint 13 is filled with lubricant to reduce the internal temperature and lubricate the moving parts within the constant velocity joint 13. In one embodiment, the lubricant is a grease, which is placed within the inner chamber 38 of the constant velocity joint 13. The constant velocity joint 13 is then sealed thereafter via the boot cover 48 and boot 52. When the constant velocity joint 13 is spinning at high speeds, the boot 52 may rupture prematurely if there is no venting of the internal pressure of the constant velocity joint 13. Current prior art constant velocity joints tend to use a venting hole in a center of an end cap or in the side of the outer race for equalizing joint pressure, but this solution in very specific conditions may not completely obstruct water and contaminants from entering the joint and may also become easily plugged by the lubricant within the joint. Therefore, at high pressures, high speeds and high temperatures, the constant velocity joint vent 60 must be able to equalize internal and external pressure differences while also stopping the ingress of contaminants into the constant velocity joint 13. Furthermore, the vent must also be resistant to grease and heat while also being pliable enough to allow for the release of the internal pressures.

In the present invention the vent 60 is located in a shoulder portion 56 orifice on the outer race 36. The vent 60 includes a flapper valve 72 which will repel any water or contaminants from entering the constant velocity joint 13 from the external environment by compressing the flapper valve 72 into the cover 58. It should be noted that the vent 60, that includes the flapper valve 72, may be designed for any functional pressure range depending on the internal pressures that are needed to hold the flapper valve 72 in position and to deform the flapper valve 72 such that it can lift off of the cover 58 to allow for venting of the high pressure gas. The vent 60 will reduce the contamination of the lubricant by preventing contamination from water or grime. It has been shown that grease will break down when mixed with water or dirt, thus reducing its lubricating properties and increasing the internal temperatures and pressures of the constant velocity joint 13. Once these pressures reach a critical point the boot will rip, tear, or rupture, thus leading to premature failure of the constant velocity joint 13.

The use of the locator projection 86 also will repel any contaminants that may slide underneath the sealing bead 88 from entering the constant velocity joint inner chamber 38 by creating a second sealing surface between the first orifice 66 of the constant velocity joint 13 and the locator projection outer surface. The flapper valve 72 will allow for the equalization in differences in pressures between the internal pressure of the constant velocity joint 13 and the external atmospheric pressures surrounding the constant velocity joint 13. This is done by lifting the flapper valve 72 and in turn the locator projection 88 from the first orifice 66. A path will be formed between the internal chamber 38 of the constant velocity joint 13, via the first orifice 66 of the cover 58, to the external outer atmosphere. Once the pressure equalization is complete, the flapper valve 72 will return, via back pressure and the spring coefficient of the first and second assembly posts 74, 76 to an engaged state with the outer surface of the cover 58. This reverse phenomenon occurs when the external atmospheric pressure is greater than the internal pressure of the constant velocity joint 13. This will cause the compression of the flapper valve 72 against the outer surface of the cover and thus provide an impervious joint to any contaminants entering from the outside atmosphere.

It should be noted that most prior art constant velocity joints use a variety of methods of venting the high pressure gas out of the joints. However, if any of the contaminants entered the inner chamber of the constant velocity joint such as water or grime, this would increase the heat and pressure which would eventually increase boot failure by either a rupture of the boot or a crack in the boot thus leading to a complete failure of the constant velocity joint. Therefore, the venting solution according to the present invention overcomes the problems with prior art devices by using a vent that is pliable and will not allow water and contaminants into the chamber of the constant velocity joint but will allow the venting of high pressure and high temperature gas to the atmosphere thus increasing the life of the constant velocity joint and its boot member. This specific vent design of the constant velocity joint according to the present invention can be used with any speed or temperature application.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A vent for a constant velocity joint for use in a vehicle, said vent including:
   a flapper valve;
   at least one post extending from a first side of said flapper valve, said at least one post defines a bending moment for said flapper valve;
   a bead extending from said first side of said flapper valve; and
   a locator projection extending from said first side of said flapper valve.

2. The vent of claim 1 further including a compression limiter extending from said flapper valve.

3. The vent of claim 1 having a first and second post.

4. The vent of claim 3 wherein said first and second post extend from a compression limiter.

5. The vent of claim 4 further including a cover, said flapper valve secured to said cover, said cover having a plurality of orifices there through.

6. The vent of claim 5 wherein said first and second post are secured within two of said plurality of orifices.

7. The vent of claim 1 wherein said post having a cone shaped end.

8. The vent of claim 1 wherein said locator projection generally having a ring like shape.

9. The vent of claim 1 wherein said flapper valve generally having a circular disc-like shape.

10. The vent of claim 1 wherein said bead extends around the outer circumference of said flapper valve.

11. The vent of claim 1 wherein said bead generally having a half circle cross section.

12. The vent of claim 4 wherein said cover is made of a metal material.

13. The vent of claim 1 wherein said flapper valve is made of a pliable material.

* * * * *